United States Patent [19]
Wechter et al.

[11] 3,920,630
[45] Nov. 18, 1975

[54] 2,2'-ANHYDRO-ARA-CYTIDINE COMPOUNDS AND PROCESS OF PREPARATION

[75] Inventors: William J. Wechter; Duane T. Gish, both of Kalamazoo, Mich.

[73] Assignee: The Upjohn Company, Kalamazoo, Mich.

[22] Filed: Sept. 5, 1972

[21] Appl. No.: 286,170

Related U.S. Application Data

[62] Division of Ser. No. 75,272, Sept. 24, 1970, abandoned.

[52] U.S. Cl............................ 260/211.5 R; 424/180
[51] Int. Cl.²........................................... C07H 19/06
[58] Field of Search........................... 260/211.5 R

[56] References Cited
UNITED STATES PATENTS

| | | | |
|---|---|---|---|
| 3,463,850 | 8/1969 | Shen et al. | 260/211.5 R |
| 3,658,788 | 4/1972 | Orgel et al. | 260/211.5 R |
| 3,709,874 | 1/1973 | Moffatt et al. | 260/211.5 R |
| 3,792,040 | 2/1974 | Moffatt et al. | 260/211.5 R |

*Primary Examiner*—Johnnie R. Brown
*Attorney, Agent, or Firm*—Martin B. Barancik; Roman Saliwanchik

[57] ABSTRACT

This invention relates to a novel process for preparing the known useful compound 2,2'-anhydro-ara-cytidine (also known as O², 2'-anhydro-ara-cytidine and O²O²'-anhydro-1-β-D-arabinofuranosylcytosine) having the formula I

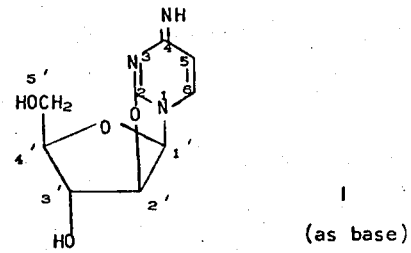

and the acid addition salts thereof. It also pertains to the preparation of novel 5'-O-acyl-2,2'-anhydro-ara-cytidines of the formula II

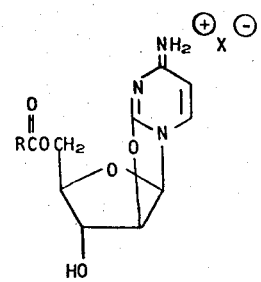

wherein $X^\ominus$ is the conjugate base of a strong acid and R is a radical selected from the group consisting of straight or branched chain aliphatic or alicylic radicals containing from 1 through 20 carbon atoms; monocyclic or bicyclic aromatic radicals of from 6 through 20 carbon atoms; monocyclic heterocyclic radicals of from 4 through 10 carbon atoms; araliphatic radicals of from 7 through 12 carbon atoms; or cage-type hydrocarbon radicals containing from 7 through 20 carbon atoms; and including such radicals substituted by halogen, hydroxyl, carboxyl, nitro, alkoxyl or mercapto substituent groups. It also pertains to the preparation from compounds of formulas I and II of 5'-O-acylates of ara-cytidine. Further, it pertains to pharmaceutical compositions of compounds of formulas I and II and a process for treatment of pathological conditions therewith. Compounds of formulas I and II have immunosuppressive activities.

4 Claims, No Drawings

2,2'-ANHYDRO-ARA-CYTIDINE COMPOUNDS AND PROCESS OF PREPARATION

CROSS REFERENCE TO RELATED APPLICATIONS

This application is a division of U.S. application, Ser. No. 75,272 filed Sept. 24, 1970, and now abandoned.

BRIEF SUMMARY OF THE INVENTION

In accordance with this invention, 2,2'-anhydro-aracytidine (I), herein also referred to as anhydro-ara-cytidine, and its 5'-O-acylates (II) have been found to have the same general biological and therapeutic activity as ara-cytidine itself. For example, they are active against proliferating neoplastic cells, such as leukemic cells. They also have antiviral and immunosuppressant activity, for example, in combatting rejection of organ and tissue transplants, and in the treatment of autoimmune diseases, for example, multiple sclerosis and rheumatoid arthritis. In general, anhydro-ara-cytidine, the 5'-O-acylates, and their therapeutic compositions can be used where ara-cytidine itself would be used. For example, the antitumor activity of $O^2,2'$-anhydro-ara-cytidine hydrochloride (I) was demonstrated by an invivo test using L1210 lymphoid leukemia in mice. The method employed closely follows the protocol established by the Cancer Chemotherapy National Service Center (CCNSC) and described in Cancer Chemotherapy Reports, No. 25, pages 1–67, 1962. Ascitic fluid (containing a known number of leukemia L1210 cells) from donor mice is implanted intraperitoneally in test mice. These mice are of the same strain (BDF$_1$), sex, source and weight ( 19 ± 2 gm.). They are randomly sorted into groups of 8–10 animals, including one control group. Therapy is initiated 24 hours subsequent to tumor implantation and continued according to the treatment schedule employed. Candidate antitumor agents are dissolved or suspended in a sterile vehicle (saline or 0.25% aqueous methylcellulose). Agents are administed either intraperitoneally (i.p.) or orally (p.o.) in a uniform volume of 0.2 ml. Control animals received only the appropriate vehicle. Mice were observed, and deaths were recorded, twice daily. In order to determine effectiveness of treatment, median survival times and per cent increases in life span (% ILS) as compared to control animals were calculated according to the CCNSC protocol. A thorough study has suggested % ILS = 25 as a minimum criterion for antitumor activity. A % ILS = 25 means that the median animal of the treated group lived 25% longer than the median animal of the untreated (control) group. The results are as follows:

2,2'-anhydro-ara-cytidine hydrochloride (I) administered at a dosage of 100 mg./kg. (i.p.) produced a 25 to 50% ILS; at 200 mg./kg. (i.p.) and 300 mg./kg. (i.p.) a 50 to 100% ILS; at 500 mg./kg. (p.o.) a 25 to 50% ILS.

Although the compounds of this invention are active against certain experimental animal tumors such as leukemia L1210, the efficacy of the compounds per se in the treatment of tumors in humans has not yet been established.

The preparation of 2,2'-anhydro-ara-cytidine hydrochloride (I) by the action of prostatic phosphatase on the 3',5'-diphosphate of the anhydro derivative, which in turn was obtained by phosphorylation of ara-cytidine with polyphosphoric acid, was first reported in Proc. Chem. Soc., 84, (1959). The preparation of 2,2'-anhydro-ara-cytidine hydrochloride (I) from 2'-chloro-2'-deoxy-ara-cytidine is described in J. Org. Chem. 32, 1462. The preparation of the 3'-phosphate ester of 2,2'-anhydro-ara-cytidine via a polytrimethylsilylated derivative of the corresponding 2',3'-cyclic phosphate, with subsequent enzymatic 3'-dephosphorylation to the 2,2'-anhydro-ara-cytidine (I) is set forth in J. Am. Chem. Soc. 91, 5409. However, none of these methods offers a convenient and low-cost process for the preparation of the compounds of Formula I. To overcome the various shortcomings of the foregoing syntheses, the present invention provides a novel more satisfactory procedure for the production of a compound of Formula I

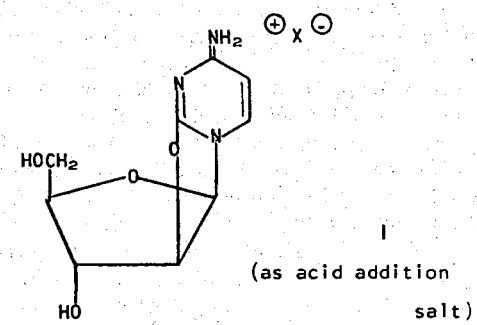

(as acid addition salt)

wherein $X^\ominus$ is the conjugate base of a strong acid, which comprises the steps of 1. mixing 2-amino-β-D-arabinofurano-[1',2':4,5]-2-oxazoline of the formula

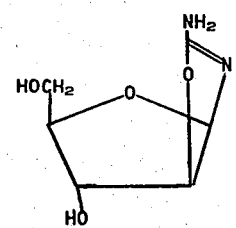

with a strong acid whose conjugate base is the same as that of the compound of Formula I, above, to yield a corresponding compound of the formula

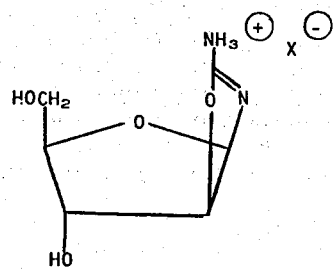

wherein $X^\oplus$ has the same meaning as above;

2. heating a thus produced compound resulting from step (1) with cyanoacetylene to yield a corresponding compound of Formula I, above.

Step (1) of the novel process involves suspending 2-amino-β-D-arabinofurano-[1',2':4,5]-2-oxazoline (prepared as in J. Mol. Biol. 47, 531) in an organic solvent such as methanol, ethanol, acetonitrile, acetone, or dimethylformamide (preferably methanol) at a temperature of from about −10° to about 40° C. (preferably about 25° C.) and an amount of a concentrated strong acid such as hydrochloric, hydrobromic, sulfuric or nitric acid (preferably hydrochloric acid or hydrogen chloride) equal to one to two moles in relation to the oxazoline (with about 1.2 moles preferred) is added. Mixing or stirring readily provides a clear solution, which on removal of the solvent (preferably under vacuum) and drying yields the desired acid addition salt of 2-amino-β-D-arabinofurano-[1′,2′:4,5]-2-oxazoline, which can be used without purification in step (2).

In step (2) of the novel process, the acid addition salt of 2-amino-β-D-arabinofurano-[1′,2′:4,5]-2-oxazoline obtained in step (1) is dissolved in an organic solvent such as dimethylformamide; dimethylacetamide, or dimethylsulfoxide, preferably dimethylacetamide, (about 0.1 mole of the aforesaid oxazoline per 100 ml. of solvent being used) and one to two moles (preferably about 1.2 moles) of cyanoacetylene is added. The resulting solution is heated from about 50° to about 130° C. (preferably at about 100° C.) for about 1 to about 2 hours (to effect cyclization) or until no further precipitate forms. The mixture is cooled, the product collected (e.g., by filtration) washed with solvents (e.g., dimethylacetamide, then ether) and dried to yield the desired 2,2′-anhydro-ara-cytidine acid addition salt (I).

The present invention also provides a novel method for the production of a compound of Formula III

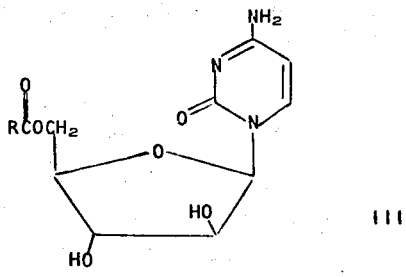

wherein R is a radical selected from the group consisting of straight or branched chain aliphatic or alicylic radicals containing from 1 through 20 carbon atoms; monocyclic or bicyclic aromatic radicals of from 6 through 20 carbon atoms; monocyclic heterocyclic radicals of from 4 through 10 carbon atoms; araliphatic radicals of from 7 through 12 carbon atoms; or cage-type hydrocarbon radicals containing from 7 through 20 carbon atoms; and including such radicals substituted by halogen, hydroxyl, carboxyl, nitro, alkoxyl or mercapto substituent groups; and acid addition salts there of; which comprises the steps of 1. acylating at the 5′-O-position of a compound of the formula

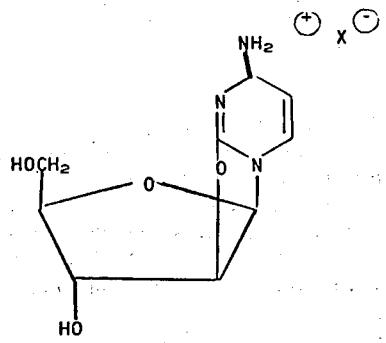

wherein $X^{\ominus}$ is the conjugate base of a strong acid, to yield a corresponding compound of the formula

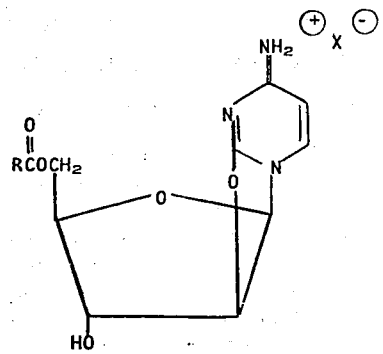

wherein $X^{\ominus}$ and R have the same meaning as above;

2. hydrolyzing at the 2,2′-anhydro bond of a thus produced compound resulting from step (1) to yield a corresponding compound of Formula III, above.

In step (1) of the novel process set forth immediately above for preparing the 5′-O-acylates (III), an acid addition salt of 2,2′-anhydro-ara-cytidine (I) is suspended in a suitable solvent such as dimethylformamide, dimethylacetamide, or hexamethylphosphoric triamide and an acylating agent (e.g., an appropriate acid chloride or acid anhydride) added. The mixture is stirred for from about 1 to about 3 days at a temperature of from about 0° to about 100° C., preferably at 25° C., until a clear solution is obtained. Acylation occurs almost exclusively at the 5′-OH position. The solvent is evaporated under vacuum and the residue dried under vacuum.

The residue thus obtained consists of crude 5′-O-acyl-2,2′-anhydro-ara-cytidine (II), admixed with some 3′5′-di-(O-acyl)-anhydro-ara-cytidine, residual starting material and other impurities. Frequently the desired 5′-O-acyl product II will crystallize selectively during evaporation and can be filtered off. In other instances the 5′-O-acylated anhydride can be further purified before or after evaporation, as expedient, by such methods as column chromatography, counter-current distribution, metathesis to an insoluble salt, or other art methods. Because of the potential lability of the 2,2′-anhydro linkage, exposure to alkaline aqueous environments must be avoided. The purified 5′-O-acyl-2,2′-anhydro-ara-cytidine (II) can be obtained as dry substances suitable for pharmaceutical formulation. The compounds of Formula II share the general antiviral, antitumor and immunosuppressive activities of ara-cytidine.

In step (2) of the novel process, the residue from step (1), a mixture of the 5′-O-acyl-2,2′-anhydro-ara-cytidine acid addition salt (II), some disubstituted compound and unreacted starting material (I), is dissolved in a mixture (about 1:1) of water and a water-miscible solvent such as methanol or ethanol, and the pH adjusted to about 8 (between about 7 and 10) with an alkali metal hydroxide solution such as sodium hydroxide. In this pH range, the 2,2′-anhydro bond of the compound of Formula II is hydrolyzed to produce the desired 5'-O-acyl-ara-cytidine (III) without significant effect on the ester bond between the acyl moiety and the 5'-O- of the arabinose moiety. The progress of the hydrolysis (II–IIi) is followed by thin layer chromatography (TLC). When TLC indicates that the anhydro compound (II) has been converted to the compound of Formula III, the solvent is removed under vacuum and the 5'-O-acyl-ara-cytidine (III), if desired, can be purified by conventional methods, for example, by crystallization from an organic-aqueous solvent, or if necessary, by column chromatography over silica gel or other support using, for example, the solvent mixture methylethylketone-acetone-water (72:20:8).

Representative values of R in the foregoing are: methyl, ethyl, t-butyl, 2,2-dimethylpropyl, 1-chloro-2,3-dimethylbutyl, 2,2-dimethylpropyl, 1-mercapto-2,2-dimethylpropyl, phenyl, 2-methylphenyl, 2,6-dimethylphenyl, 2,4,6-trimethylphenyl, 1-naphthyl, 2-naphthyl,

 ,  ,  ,

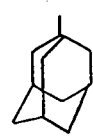 ,  , 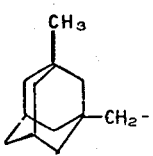 ,

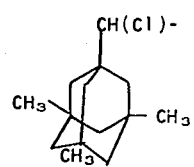 , 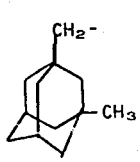 ,  ,

 ,  , 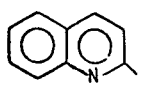 ,

 , 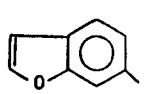 , and also groups which, together with the

group make up the acyl group of polycarboxylic acids such as glutamic, glutaric, succinic, fumaric, aconitic, itaconic, levulinic, 3,3-dimethylglutaric and other 3,3-dialkylglutaric acids and other acids as will be exemplified later.

One important class of the 5'-O-acyl-ara-cytidines (III) prepared by the novel process are those wherein the acylating agent employed in step (1) is the acyl halide or anhydride of an aliphatic acid containing 1 through 20 carbon atoms, such as acetyl chloride or anhydride, isobutyryl bromide or anhydride, caproyl chloride or anhydride, palmityl chloride or anhydride, stearyl chloride or anhydride, lauryl chloride or anhydride, oleyl chloride or anhydride, myristic chloride or anhydride, isomers thereof and the like.

All of the compounds included within Formulae I, the intermediates therefor, II and III, above, can be isolated from their respective reaction mixtures by conventional means, for example, when a water-miscible solvent is used, by pouring the reaction mixture into water and separating the resulting precipitate by filtration or by extraction with water-immiscible solvents. In general, the 2,2'-anhydro bond in compounds of Formulae I and II are fairly stable in aqueous solution as long as the NH group at carbon 4 is protonated, i.e., if the compound is as the acid addition salt. However, prolonged exposure to aqueous environments should be avoided. Additional purification of the products can be accompleshed by conventional means, for example, by elution chromatography from an adsorbent column with a suitable solvent such as acetone, ethyl acetate, ether, or mixtures and combinations of these solvents; also by gradient elution chromatography from an absorbent column with a suitable mixture of solvents such as those above.

For oral administration, 2,2'-anhydro-ara-cytidine, and acid addition salts thereof, of Formula I and 5'-O-acylates thereof of Formula II can be formulated with a pharmaceutical carrier to give solid or fluid unit dosage forms. Suitable solid forms include tablets, coated, for example enteric coated, or uncoated; pills, capsules, hard or soft; granules, powders, cachets and the like. Enteric coated tablets are a preferred form. Suitable coatings for coated tablets include a sealing coat of shellac, a taste-disguising carbohydrate coating such as sugar and methyl cellulose, and a lipid polish coating of, for example, carnauba wax. The coating can comprise (a) lipid type coatings of a semi-permeable nature for delaying absorption of the principal active ingredient to provide sustained action; or (b) enteric substances such as styrene maleic acid copolymer and cellulose acetate phthalate to resist release of the active ingredient in the stomach and permit release in the upper intestine. Advantageously, the pharmaceutical diluent and carrier for such solid forms include corn starch, lactose, dicalcium phosphate, terra alba (calcium sulfate), talc, stearic acid, magnesium stearate, and gums. Suitable fluid forms include solutions, suspensions, syrups, and emulsions. Advantageously, the pharmaceutical carrier for such fluid forms comprise water, oils, and water-oil emulsions. If desired, suitable dispersing or suspending agents can be included, for exaple, polysorbate 80, tragacanth, acacia, agar, lecithin, dextran, sodium carboxymethylcellulose, methylcellulose, polyvinylpyrrolidone, gelatin, and mixtures thereof. Suitable oils for solutions and water-oil emulsions include cottonseed oil, sesame oil, coconut oil, and peanut oil. Aqueous formulations, where used, should be freshly prepared.

For parenteral administration, compounds of Formulae I and II can be formulated in dilute aqueous solutions, aqueous suspensions, and oil dispersions in unit dosage form for intramuscular injection, intraveneous drip, vascular perfusion, or like routes. Advantageously, a solubilizer, for example, N,N-dimethylacetamide (preferred), ethanol and the like can be utilized. If desired, other aqueous media such as water for injection, normal saline solution, Ringer's solution, blood plasma, and whole blood can be used.

Compositions of 2,2'-anhydro-ara-cytidine and their acid addition salts (I) and their 5'-O-acylates (II) for local and topical application, for example, to a surgical field, intravaginally, intraurethrally, and like applications, include powders, aerosols, ointments, creams, lotions, pastes, jellies, suppositories and the like. Such compositions of the essential active ingredient can include emulsifying agents, solvents, antioxidants, preservatives, buffers, and bodying materials.

For the treatment of domestic birds and animals by oral administration, the compounds of Formulae I and II are conveniently prepared in the form of a food premix. The food premix can comprise the aforesaid compounds in admixture with an edible pharmaceutical diluent of the type previously mentioned such as starch, oatmeal, flour, calcium carbonate, talc, dried fish meal and the like non-toxic, orally acceptable pharmaceutical diluents. The prepared premix is then conveniently added to the regular feed, thereby providing medication to the animal or bird in the course of feeding.

The term "unit dosage form" as used in the specification and claims refers to physically discrete units suitable as unitary dosages for human subjects and animals, each unit containing a predetermined quantity of active material calculated to produce the desired therapeutic effect in association with the required pharmaceutical diluent, carrier or vehicle. The specification for the novel unit dosage forms of this invention are directly dependent on (a) the unique characteristics of the active material and the particular therapeutic effect to be achieved, and (b) the limitations inherent in the art of compounding such an active material for therapeutic use in humans and animals, as disclosed in detail in this specification, these being features of the present invention. Examples of suitable unit dosage forms in accord with this invention are tablets, coated or uncoated; capsules, hard or soft; suppositories, powder packets, granules, pills, teaspoonfuls segregated multiples of any of the foregoing, and other forms as herein described. The compositions of the present invention comprise in unit dosage form, from about 1 mg. to about 1 gm. of 2,2'-anhydro-ara-cytidine and acid addition salts and 5'-O-acylates in association with a pharmaceutical carrier.

The dosage of 2,2'-anhydro-ara-cytidine and acid addition salts (I) and its 5'-O-acylates (II) depends upon the route of administration, the circumstances of treatment (e.g., severity of disease, adjuvant therapy, and length of treatment), as well as the subject's age, weight, and general physical condition. In general, a total daily dosage of from about 1 to about 1000 mg/kg is effective. The lower dosages can be followed for chronic administration and the higher dosages for acute. Single daily, divided daily, or intermittent schedules can be employed. For surgical field treatment and other local and topical applications, formulations containing 0.5 to 25% of the active material, and preferably 2–5%, can be used. Higher concentrations than 25% can be used for some local applications.

The compositions described hereinbefore can include supplementary active ingredients which extend the usefulness of the essential active ingredient or accelerate the desired clinical response to therapy. Of particular interest in this regard are antibiotics such as tetracycline, actinomycin C and D, chlortetracycline, penicillin, novobiocin, neomycin and the like in compositions for surgical field treatment; antimonilial agents such as nystatin, amphotericin B, trichomycin and the like in compositions for antitrichomonal use; hormones, such as diethylstilbesterol, progesterone, medroxyprogesterone, and estradiol; fluoxymesterone, methyltestosterone, and testosterone; and particularly alkylating agents such as busulfan, chlorambucil, cyclophosphamide, mechloroethamine hydrochloride, thio-Tepa, triethylene melamine and 5-[bis(2-chloroethyl)amino]uracil.

The administration of the composition of the present invention provides the veterinarian with a method for treating malignantly proliferating neoplasms such as carcinomas, lymphomas and sarcomas, and trichomonal and fungal infections.

The administration of the compositions of the present invention similarly provide the physician with a method of combatting rejection of organ transplants is useful in the treatment of autoimmune diseases, such as multiple sclerosis and rheumatoid arthritis.

DETAILED DESCRIPTION

The following examples describe some preferred forms and practices of this invention, but they are not to be construed as limiting the scope thereof.

EXAMPLE 1

2-Amino-$\beta$-D-arabinofurano-[1',2':4,5]-2-oxazoline hydrochloride.

To 15 ml. of 6M ammonium hydroxide and 75 ml. of methanol, 45 g. (0.3 mole) of D(-)-arabinose and 25.2 g. (0.6 mole) of cyanamide is added and the resulting mixture stirred at room temperature for about 16 hours. The mixture is stored in the cold with stirring for about 72 hours, then cooled in an ice-salt bath for several hours. The solid is collected, washed with cold methanol, then ether and air dried, to give 37.6 g. (72% of theoretical yield) of 2-amino-$\beta$-D-arabinofurano-[1',2':4,5]-2-oxazoline, melting at 180.5 to 181.5° C. (with decompostion).

Anal. Calcd. for $C_6H_{10}N_2O_4$: C, 41.40; H, 5.79; N, 16.08. Found: C, 41.20; H, 6.07; N, 16.14.

Infra red (IR) absorption: NH/OH 3410, 3330, 3290, 3240, 3190, 3140, 2800, 2720, 2680 ($cm.^{-1}$). C=N/NH def 1670, 1610 ($cm.^{-1}$); C-O/CN/other 1445, 1780, 1080, 1065, 1050, 1005, 950, 885 ($cm.^{-1}$).

To 52.2 g. (0.3 mole) of 2-amino-$\beta$-D-arabinofurano-[1',2':4,5]-2-oxazoline suspended in 300 ml. of methanol, 27 ml. of concentrated hydrochloric acid is added. The mixture is stirred to effect solution, and the solvent removed under vacuum to give a glassy residue which is further dried under vacuum to give 2-amino-β-D-arabinofurano-[1',2':4,5]-2-oxazoline hydrochloride.

Following the procedure of the immediately preceding paragraph but substituting for hydrochloric acid, another acid such as hydrobromic, sulfuric, phosphoric, nitric, trifluoroacetic, trichloroacetic acid, and the like, yields the corresponding acid addition salt of 2-amino-β-D-arabinofurano-[1',2':4,5]-2-oxazoline.

EXAMPLE 2

2,2'-anhydro-ara-cytidine hydrochloride
[$O^2,O^2$-anhydro-1-β-D-arabinofuranosylcytosine hydrochloride, or
2,2'-anhydro-1-(β-D-arabinofuranosyl)cytosine] (I)

In accordance with the procedure described in Nippon Kagaku Zusshi 77, 1689, about 500 ml. of ammonia is cooled in a flask to about −80° C. and 100 ml. of methyl propiolate slowly added. The clear solution is allowed to stand at about −80° C. for about 22 hours. Most of the ammonia is then allowed to evaporate and the solid dried under vacuum while keeping the flask in an ice bath, to give 81 g. (94% theoretical yield) of acetylenecarboxamide.

About 175 ml. of dry xylene and 75 g. of phosphorus pentoxide is magnetically stirred in a 2-liter 3-necked flask fitted with a take-off head, a condenser, a curved adapter fitted with a calcium chloride drying tube and a receiving flask cooled in an ice-bath. The apparatus is flushed with nitrogen and 25 g. of acetylenecarboxamide added and thoroughly mixed with the phosphorus pentoxide and rapidly warmed on an oil bath until the bath temperature nears 125° C., when the rate of heating is slowed. When the bath temperature reaches 135° C. the reaction begins and the sticky mass swells as the reaction proceeds. The product distills at about 40 to 45° C. to give 13.8 g. (75% of theoretical) cyanoacetylene, having a melting point of 5° C.

The 2-amino-β-D-arabinofurano-[1',2':4,5]-2-oxazoline hydrochloride prepared in Example 1 is dissolved in 300 ml. of dimethylacetamide, and about 17 g. (10% excess) of cyanoacetylene is added. The mixture warms spontaneously to about 55° C. and then cools to room temperature. The solution is heated at about 95° C. for about 2 hours to effect cyclization, during which time the product separates as a white crystalline solid. The mixture is cooled, the product collected, washed first with dimethylacetamide, then with ether and dried to give 41.5 g. (53% of theoretical yield) of 2,2'-anhydro-ara-cytidine hydrochloride (I), having a melting point of 260° C. (with decomposition) and rotation $[\alpha]_D^{25}$ of −79° (chloroform, dimethylsulfoxide).

Anal. Calcd. for $C_9H_{11}N_3O_4 \cdot HCl$: C, 41.31; H, 4.62; N, 16.06; Cl, 13.55. Found: C, 41.12; H, 5.12; N, 15.68; Cl, 13.60.

IR spectrum: $OH/NH^+$ 3310, 3180, 3110, weak peaks 2800-2600 ($cm.^{-1}$). C=N/C=C 1685s., 1660s., 1575, 1560, 1500 ($cm.^{-1}$). C-O/C-N/other 1265, 1205, 1110, 1090, 1070, 1030, 1000, 995 ($cm.^{-1}$). other 965, 930, 805, 790, 735 ($cm.^{-1}$).

Following the procedure of Example 2 but substituting for the hydrochloride of 2-amino-β-D-arabinofurano-[1',2': 4,5]-2-oxazoline another acid addition salt of said compound, yields a corresponding acid addition salt of $O^2$,2'-anhydro-ara-cytidine (I), e.g., the hydrobromide, sulfate, phophate, nitrate, trifluoroacetate, trichloroacetate, and the like.

The acid addition salts of 2,2'-anhydro-ara-cytidine (I) can be converted to the free base by neutralization with a dilute aqueous solution of sodium hydroxide or potassium hydroxide.

EXAMPLE 3

5'-O-Acetyl-2,2'-anhydro-ara-cytidine hydrochloride (II)

A 2.6 g. (10 millimoles) sample of 2,2'-anhydro-ara-cytidine hydrochloride (prepared as in Example 2) is suspended in 50 ml. of dimethylformamide. To this suspension, 0.94 g. (12 millimoles) of acetyl chloride is added dropwise. The reaction mixture is stirred at about 25° C. for about 36 hours, then poured into 60 ml. of water and the mixture evaporated to dryness under vacuum. The residue is dissolved in chloroform, the resulting solution washed with water then saturated sodium chloride solution and dried over sodium sulfate. The chloroform is distilled off under vacuum and the residue crystallized from acetone to give 5'-O-acetyl-2,2'-anhydro-ara-cytidine hydrochloride (II).

Following the procedure of Example 3 but substituting for acetyl chloride, another acylating agent such as
1. pivaloyl chloride,
2. isobutyryl bromide,
3. octanoyl chloride,
4. myristyl chloride,
5. stearyl chloride,
6. oleyl anhydride,
7. β-chloropivaloyl chloride,
8. p-nitrobenzoyl chloride,
9. o-toluoyl chloride,
10. benzoyl chloride,
11. 2,6-dimethylbenzoyl chloride,
12. 2,4,6-trimethylbenzoyl chloride,
13. 1-fluorenecarbonyl chloride,
14. 1-naphthoyl chloride,
15. 1-indenecarbonyl chloride,
16. p-anisoyl chloride,
17. 3,4,5-trimethoxybenzoyl chloride,
18. 1-norbornanecarbonyl chloride,
19. 1-adamantanecarbonyl chloride,
20. [α-chloro-3,5,7-trimethyl-1-adamantyl acetyl chloride,
21. cyclopentanecarbonyl chloride,
22. picolinyl chloride,
23. tetrahydrofuryl chloride,
24. 10-xanthinecarbonyl chloride,
25. nicotinyl chloride,
26. 4-cinnolinecarbonyl chloride,
27. 5-bromo-2-furoyl chloride,
28. coumalyl chloride,
29. 2-quinuclidinecarbonyl chloride,
30. N-trichloroethox,carbonyl-2-indole carbony chloride,
31. trans-(3-n-propyl)-hygric acid chloride, 32 fumaryl chloride,
33. succinic anhydride,
34. 3,3-dimethylglutaric anhydride,
35. aconitic anhydride, etc.,
yields, respectively, the following compounds of Formula II:
1. 2,2'-anhydro-5'-O-pivaloyl-ara-cytidine hydro chloride, 2. 2,2'-anhydro-5'-O-isobutyryl-ara-cytidine hydrochloride,
3. 2,2'-anhydro-5'-O-octanoyl-ara-cytidine hydrochloride,
4. 2,2'-anhydro-5'-O-myristyl-ara-cytidine hydrochloride,
5. 2,2'-anhydro-5'-O-stearyl-ara-cytidine hydrochloride,
6. 2,2-anhydro-5'-O-oleyl-ara-cytidine hydrochloride,
7. 2,2'-anhydro-5'-O-$\beta$-chloropivaloyl-ara-cytidine hydrochloride,
8. 2,2'-anhydro-5'-O-nitrobenzoyl-ara-cytidine hydrochloride,
9. 2,2'-anhydro-5'-O-o-toluoyl-ara-cytidine hydrochloride,
10. 2,2'-O-benzoyl-ara-cytidine hydrochloride,
11. 2,2'-anhydro-5'-O-2,6-dimethylbenzoyl-ara-cytidine hydrochloride,
12. 2,2'-anhydro-5'-O-2,4,6-trimethylbenzoyl-ara-cytidine hydrochloride,
13. 2,2'-anhydro-5'-O-1-indenecarbonyl-ara-cytidine hydrochloride,
14. 2,2'-anhydro-5'-O-1-naphthoyl-ara-cytidine hydrochloride,
15. 2,2'-anhydro-5'-O-1-indenecarbonyl-ara-cytidine hydrochloride,
16. 2,2'-anhydro-5'-O-p-anisoyl-ara-cytidine hydrochloride,
17. 2,2'-anhydro-5'-O-3,4,5-trimethoxybenzoyl-ara-cytidine hydrochloride,
18. 2,2'-anhydro-5'-O-1-norbornylcarbonyl-ara-cytidine hydrochloride,
19. 5'-O-1-adamantoyl-2,2'-anhydro-ara-cytidine hydrochloride,
20. 2,2'-anhydro-5'-O-[$\alpha$-chloro-3,5,7-trimethyl-1-adamantyl)acetyl]-ara-cytidine hydrochloride,
21. 2,2'-anhydro-5'-O-cyclopentylcarbonyl-ara-cytidine hydrochloride,
22. 2,2'-anhydro-5'-O-picolinoyl-ara-cytidine hydrochloride,
23. 2,2'-anhydro-5'-O-tetrahydro-2-furoyl-ara-cytidine hydrochloride,
24. 2,2'-anhydro-5'-O-(10-xanthylcarbonyl)-ara-cytidine hydrochloride,
25. 2,2'-anhydro-5'-O-nicotinoyl-ara-cytidine hydrochloride,
26. 2,2'-anhydro-5'-O-4-cinnolinoyl-ara-cytidine hydrochloride,
27. 2,2'-anhydro-5'-O-(5-bromo-2-furoyl)-ara-cytidine hydrochloride,
28. 2,2'-anhydro-5'-O-coumaloyl-ara-cytidine hydrochloride,
29. 2,2'-anhydro-5'-O-2-quinuclidinylcarbonyl-ara-cytidine hydrochloride,
30. 2,2'-anhydro-5'-O-2-indolylcarbonyl-ara-cytidine hydrochloride,
31. 2,2'-anhydro-5'-O-trans-3-(n-propyl)-hygroyl-ara-cytidine hydrochloride,
32. 2,2'-anhydro-5'-O-hemifumaroyl-ara-cytidine hydrochloride,
33. 2,2'-anhydro-5'-O-hemisuccinoyl-ara-cytidine hydrochloride,
34. 2,2'-anhydro-5'-O-hemi-(3,3-dimethylglutaroyl)-ara-cytidine hydrochloride,
35. 5'-O-aconitoyl-2,2'-anhydro-ara-cytidine hydrochloride, etc.

EXAMPLE 4

5'-O-acetyl-ara-cytidine (III)

The 5'-O-acetyl-2,2'-anhydro-ara-cytidine hydrochloride obtained in Example 3 is dissolved in a 1:1 mixture of water and methanol and the pH of the resulting solution adjusted to about 8 with sodium hydroxide. The progress of the hydrolysis is followed by tlc. When this is complete, the solvent is removed under vacuum and the residue chromatographed on silica gel (silicic acid), packed and eluted with methylethyl ketone-acetone-water (72:20:8) and the fractions containing and desired product are combined and evaporated to dryness. The residue is rechromatographed on silica gel and the fractions containing the desired product combined and evaporated to dryness. The residue is crystallized from aqueous methanolbenzene to give pure 5'-O-acetyl-ara-cytidine (III).

Following the procedure of Example 4 but substituting other 5'-acylates of an acid addition salt of 2,2'-anhydroara-cytidine (II), such as 1. 2,2'-anhydro-5'-O-propionyl-ara-cytidine hydrochloride,
2. 2,2'-anhydro-5'-O-valeryl-ara-cytidine hydrobromide,
3. 2,2-anhydro-5'-O-myristyl-ara-cytidine hydrochloride,
4. 2,2'-anhydro-5'-O-benzoyl-ara-cytidine hydrochloride,
5. 2,2'-anhydro-5'-O-1-fluorenecarbonyl-ara-cytidine hydrochloride,
6. 2,2'-anhydro-5'-O-p-anisoyl-ara-cytidine hydrochloride,
7. 5'-O-1-adamantoyl-2,2'-anhydro-ara-cytidine hydrochloride,
8. 2,2'-anhydro-5'-O-coumarin-3-carbonyl-ara-cytidine nitrate,
9. 2,2'-anhydro-5'-O-2-pyrolycarbonyl-ara-cytidine hydrochloride,
10. 2,2'-anhydro-5'-O-hemisuccinyl-ara-cytidine hydrochloride, etc., yields, respectively, the following compounds of Formula III:

1. 5'-O-propionyl-ara-cytidine,
2. 5'-O-valeryl-ara-cytidine,
3. 5'-O-myrislyl-ara-cytidine,
4. 5'-O-benzoyl-ara-cytidine,
5. 5'-O-1-fluorenecarbonyl-ara-cytidine,
6. 5'-O-p-anisoyl-ara-cytidine,
7. 5'-O-1-adamantoyl-ara-cytidine,
8. 5'-O-coumarin-3-carbonyl-ara-cytidine,
9. 5'-O-2-pyrrolylcarbonyl-ara-cytidine,
10. 5'-O-hemisuccinyl-ara-cytidine, etc.

EXAMPLE 5

5'-O-palmitoyl-2,2'-anhydro-ara-cytidine hydrochloride (II)

2,2'-Anhydro-ara-cytidine hydrochloride (I) (5.2 g., 0.02 mole) is dissolved in 200 ml. of hexamethylphosphoric triamide and 6.6 g. (0.024 mole) of palmityl chloride is added. The mixture is allowed to stand for 72 hr. at room temperature. The product is precipitated with 2 liters of petroleum ether. The solvent is decanted from the resultant oil, and the oil is crystallized by stirring with 100 ml. ether. The solid is collected by filtration, washed with ether, and dried. The product is recrystallized from water.

The recovery is 4.6 g. (46%). The m.p. is indefinite, beginning at abut 195°. This material is recrystallized from 25 ml. 1-butanol. The recovery is 3.1 g. A sample is recrystallized from 1-butanol to yield 5'-O-palmitoyl-2,2'-anhydro-ara-cytidine (II) for analysis. There was no change is melting point.

Anal. Calcd. for $C_{25}H_{42}N_3O_5Cl$: C, 60.04; H, 8.47; N, 8.40; Cl, 7.09. Found: C, 59.97; H, 8.61; N, 8.17; Cl, 6.69.

IR (Nujol mull): OH/NH$^-$ 3300, 3120; C=O 1745; C=N 1670; C=N/C=C 1565, 1525, 1500; C-O/C-N/other 1275, 1205, 1145, 1095, 1020, 965; other 810.

UV(methanol): 234 m$\mu$, $\epsilon$ = 9,750; 263 m$\mu$, $\epsilon$ = 10,900.

EXAMPLE 6

5'-O-palmitoyl-ara-cytidine (III) from 5'-O-palmitoyl-2,2'-anhydro-ara-cytidine hydrochloride (II)

5'-O-palmityl-2,2'-anhydro-ara-cytidine hydrochloride (II) from Example 5 (0.5 g., 0.001 mole) is dissolved in 1 ml. methanol and 10.0 ml. of 0.10N sodium hydroxide is added. The mixture is stirred for about 20 minutes. The solid is collected by filtration, washed, and dried. Yield 0.4 g. (83%). Thin layer chromatography showed 5'-O-palmitoyl-ara-cytidine as the sole UV- absorbing product.

EXAMPLE 7

TABLET COMPOSITION

Ten thousand tablets for oral use, each containing 100 mg. of 2,2'-anhydro-ara-cytidine hydrochloride are prepared from the following ingredients:

| | |
|---|---|
| 2,2'-anhydro-ara-cytidine hydrochloride | 1000 gm. |
| Lactose | 1250 gm. |
| Talc | 300 gm. |

The powdered materials are thoroughly mixed and granulated by slugging. The granules are mixed with a lubricant mixture of 100 gm. of bolted starch and 20 gm. of calcium stearate and then compressed into tablets. The tablets can be coated or uncoated. Suitable coatings include a sealing coat of shellac, a taste-disguising carbohydrate coating such as sugar and methyl cellulose, and a lipid polish coating of, for example, carnauba wax. The coating can comprise (a) lipid type coatings of a semi-permeable nature for delaying absorption of the principal active ingredient to provide sustained action, or (b) enteric substances such as styrene maleic acid copolymer and cellulose acetate phthalate to resist release of the active ingredient in the stomach and permit release in the upper intestine. These tablets are suitable for clinical use, preferably administered at the rate of one tablet daily.

5'-O-Palmitoyl-2,2'-anhydro-ara-cytidine may be substituted for 2,2'-anhydro-ara-cytidine on an equimolar basis.

EXAMPLE 8

Hard-gelatin capsule composition

Ten thousand two-piece hard-gelatin capsules for oral use, each capsule containing 75 mg. of 2,2'-anhydro-ara-cytidine hydrochloride are prepared from the following ingredients:

| | |
|---|---|
| 2,2'-anhydro-ara-cytidine hydrochloride | 750 gm. |
| Cornstarch | 1600 gm. |
| Light mineral oil | 130 gm. |
| Magnesium stearate, powder | 160 gm. |
| Talc | 160 gm. |

The powdered ingredients are thoroughly mixed and encapsulated in the usual manner. The resulting capsules can be administered clinically at the rate of one capsule daily.

Substitution of 150 gm. of active ingredient for the 750 gm. above yields capsules each containing 15 mg. thereof which can be administered at the rate of one capsule 4 times daily.

EXAMPLE 9

Soft-elastic capsule composition

Ten thousand soft-elastic capsules for oral use, each containing 225 mg. of 2,2'-anhydro-ara-cytidine hydrochloride are prepared by dispersing 2250 gm. of the aforesaid compound in sufficient corn oil to render the drug capsulatable and thereafter forming soft-elastic capsules in the usual manner. One capsule daily achieves an effective dosage schedule.

Substitution of 10,000 gm. of the active ingredient for the 2250 gm. above gives capsules each containing 1000 mg. thereof which can be administered on a schedule of one capsule daily.

EXAMPLE 10

Aqueous suspension

Ten liters of an aqueous suspension for oral use containing 15 mg. of 2,2'-anhydro-ara-cytidine hydrochloride per 5 ml. of suspension is prepared immediately before use by thoroughly mixing the following ingredients:

| | |
|---|---|
| 2,2'-anhydro-ara-cytidine hydrochloride | 30 gm. |
| Methylparaben | 7.5 gm. |
| Propylparaben | 2.5 gm. |
| Saccharin sodium | 12.5 gm. |
| Glycerin | 3000 gm. |
| Tragacanth powder | 10 gm. |
| Orange oil flavor | 10 gm. |
| F. D. and C. orange dye | 7.5 gm. |
| Deionized water, q.s. | 10,000 ml. |

The suspension prepared as above is suitable for clinical use and can be administered at the rate of 1 teaspoonful (5 ml.) 3 times daily.

5'-O-Palmitoyl-2,2'-anhydro-ara-cytidine may be substituted for 2,2'-anhydro-ara-cytidine on an equimolar basis.

EXAMPLE 11

Capsule composition

Ten thousand har gelatin capsules, each containing 125 mg. of 2,2'-anhydro-ara-cytidine hydrochloride and 250,000 units of nystatin, are prepared from the following:

| | |
|---|---|
| 2,2'-anhydro-ara-cytidine hydrochloride | 1250 gm. |
| Nystatin (2000 units/mg.) | 1250 gm. |
| White mineral oil | 65 gm. |
| Magnesium stearate, powdered | 65 gm. |
| Talc | 65 gm. |

The ingredients are thoroughly mixed and capsulated in the usual manner. The capsules can be administered at the rate of one capsule three times daily.

EXAMPLE 12

Sterile powder (for local use)

A 5000 gm. quantity of sterile powder for local use in a surgical field or for topical application, is prepared from the following ingredients:

| | |
|---|---|
| 2,2'-anhydro-ara-cytidine hydrochloride, fine powder | 250 gm. |
| Lactose U.S.P., fine powder | 4750 gm. |

Advantageously, to the above preparation is added 5 gm. of 5-[bis(2-chloroethyl)amino]uracil by replacing an equal amount of the lactose. Alternatively, 10 gm. of 5-[bis(2-chloroethyl)amino]uracil can be added replacing an equal amount of lactose.

EXAMPLE 13

Jelly

A jelly containing 10 mg. of 2,2'-anhydro-ara-cytidine hydrochloride per gm. (1% by weight) is prepared by thoroughly mixing together the following ingredients:

| | |
|---|---|
| 2,2'-anhydro-ara-cytidine hydrochloride | 10 gm. |
| Polysorbate 80 | 14 gm. |
| Polyethylene glycol 400 | 50 gm. |
| Sodium carboxymethylcellulose, low viscosity | 20 gm. |
| Sodium chloride | 8 gm. |
| Sodium benzoate | 3 gm. |
| Water, q.s. | 1000 gm. |

The resulting jelly is applied topically to a surgical filed or affected area, preferably twice daily.

EXAMPLE 14

Sterile aqueous suspension

A sterile aqueous suspension suitable for intramuscular injection and containing 100 mg. of 2,2'-anhydro-ara-cytidine hydrochloride in each ml. is prepared immediately before use from the following ingredients:

| | |
|---|---|
| 2,2'-anhydro-ara-cytidine hydrochloride | 100 gm. |
| Polyethylene glycol 400 | 30 gm. |
| Sodium chloride U.S.P. | 9 gm. |
| Myristyl-gamma-picolinium chloride | 0.2 gm. |
| Water, q.s. | 1000 ml. |

5'-O-palmitoyl-2,2'-anhydro-ara-cytidine may be substituted for 2,2'-anhydro-ara-cytidine on an equimolar basis.

EXAMPLE 15

Oil preparation for I.M. injection

A sterile preparation suitable for intramuscular injection and containing in each ml. 25 mg. of 2,2'-anhydro-ara-cytidine hydrochloride is prepared from the following materials:

| | |
|---|---|
| 2,2'-anhydro-ara-cytidine hydrochloride | 250 gm. |
| Aluminum monostearate - peanut oil gel, q.s. | 10,000 ml. |

A mixture of two parts aluminum monostearate and 98 parts of peanut oil (parts by weight) is slowly heated with stirring, to 100° C. The mixture is heated at this temperature until gelation is complete (about 1 hr.); and is then heated to 150° C. and maintained at this temperature for 1 hour. The gel is cooled and the 250 gm. of sterile, powdered 2,2'-anhydro-ara-cytidine hydrochloride are aseptically stirred into a volume less than 10,000 ml. The final total volume is adjusted to 10,000 ml. by incorporating additional gel.

EXAMPLE 16

Following the procedure of preceding Examples 5 through 13, but substituting for 2,2'-anhydro-ara-cytidine hydrochloride of these examples an equivalent amount of each of another acid addition salt such as the hydrobromide, sulfate, nitrate, phosphate, trifluoroacetate, tribromoacetate, trichloroacetate, and the like, or the free base 2,2'-anhydro-ara-cytidine, similarly useful compositions can be prepared.

EXAMPLE 17

Following the procedure of Examples 5 through 13, but substituting the 2,2'-anhydro-ara-cytidine by an equivalent amount of 5'-O-acyl-2,2'-anhydro-ara-cytidine, such as 5'-O-acetyl-, 5'-O-palmitoyl-, or 5'-O-(1-adamantoyl)- (i.e., Ara-cytidine-5'-O-(1-adamantanecarboxylate) ara-cytidine or pharmaceutically acceptable acid addition salts thereof, similarly useful compositions can be prepared.

EXAMPLE 18

Composition for oral administration 4.0 g. of 5'-O-palmitoyl-2,2'-anhydro-ara-cytidine hydrochloride (II) is dissolved in 115 ml. ethanol. To this solution is added 205 ml. of an aqueous solution containing 1.0 g. of aerosol OTB (diocyl sodium sulfosuccinate N.F.). A clear solution for oral administration is obtained. The composition should be freshly prepared before use.

We claim:

1. A process for the production of a compound of the formula

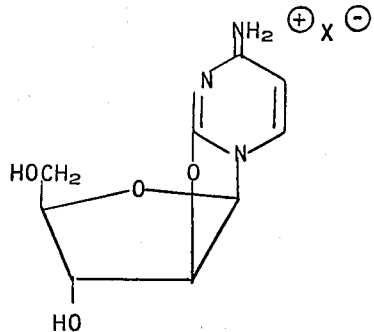

wherein $X^{\ominus}$ is the conjugate base of a strong acid, which comprises the steps of
1. mixing 2-amino-β-D-arabinofurano-[1',2':4,5]-2-oxazoline of the formula

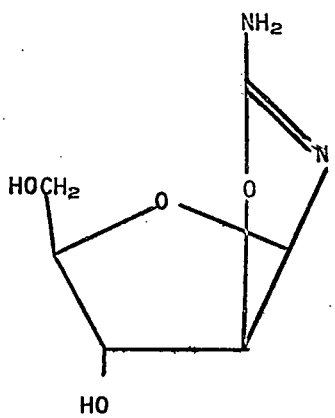

with a strong acid whose conjugate base is the same as that of the compound of Formula I, above, to yield a corresponding compound of the formula

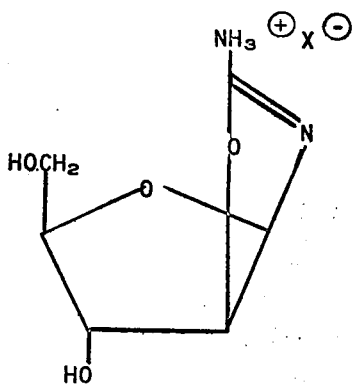

wherein X⊖ has the same meaning as above;

2. heating a thus produced compound resulting from step (1) with cyanoacetylene to yield a corresponding compound of Formula I, above.

2. A process in accordance with claim 1 wherein the strong acid is hydrochloric acid and the compound of Formula I is 2,2'-anhydro-ara-cytidine hydrochloride.

3. A compound of the formula

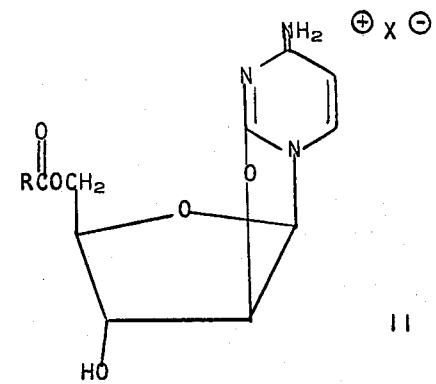

wherein C⁻ is the conjugate base of a strong acid and R is a radical selected from the group consisting of straight chain aliphatic, branched chain aliphatic and alicyclic radicals of from 1 through 20 carbon atoms, monocyclic and bicyclic aromatic radicals of from 6 through 20 carbon atoms, monocyclic heterocyclic radicals of from 4 through 10 carbon atoms, aralaphatic radicals of from 7 through 12 carbon atoms, cage-type hydrocarbon radicals containing from 7 through 20 carbon atoms, by radicals selected from the group consisting of halogen hydroxyl, carboxyl, nitro, mercapto and alkoxyl containing from 1 through 20 carbon atoms, and R when taken together with

is the acyl radical of an aliphatic dicarboxylic acid of from 3 through 8 carbon atoms; and pharmaceutically acceptable acid addition salts thereof.

4. A compound of claim 3 wherein

is palmitoyl and the strong acid is hydrochloric acid, namely, 5'-O-palmitoyl-2,2'-anhydro-ara-cytidine hydrochloride.

* * * * *